US012285881B2

United States Patent
Sigafoose et al.

(10) Patent No.: US 12,285,881 B2
(45) Date of Patent: Apr. 29, 2025

(54) OFFSET BASE FOR ROUTER

(71) Applicant: MILWAUKEE ELECTRIC TOOL CORPORATION, Brookfield, WI (US)

(72) Inventors: Tyler S. Sigafoose, Pewaukee, WI (US); Jeffery D. Spraggon, Oak Creek, WI (US); Andrew D. Van Hoorn, Menomonee Falls, WI (US); Zhenxin Dong, Huizhou (CN); Ye Wang, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 1214 days.

(21) Appl. No.: 17/052,454

(22) PCT Filed: May 14, 2020

(86) PCT No.: PCT/US2020/032800
§ 371 (c)(1),
(2) Date: Nov. 2, 2020

(87) PCT Pub. No.: WO2020/232199
PCT Pub. Date: Nov. 19, 2020

(65) Prior Publication Data
US 2021/0237306 A1 Aug. 5, 2021

Related U.S. Application Data

(60) Provisional application No. 62/848,254, filed on May 15, 2019.

(30) Foreign Application Priority Data

Jan. 20, 2020 (CN) .......................... 202020132856.5

(51) Int. Cl.
*B23C 1/20* (2006.01)
*B23Q 5/04* (2006.01)
(Continued)

(52) U.S. Cl.
CPC .................. *B27C 5/10* (2013.01); *B23C 1/20* (2013.01); *B23Q 5/046* (2013.01); *B23Q 11/128* (2013.01);
(Continued)

(58) Field of Classification Search
CPC ... B27C 5/10; B23Q 5/046; B23Q 9/00–9/02; B23C 1/20;
(Continued)

(56) References Cited

U.S. PATENT DOCUMENTS 1,514,894 A * 11/1924 Carter ....................... B27C 5/10
409/182
1,874,232 A 8/1932 Groene et al.
(Continued)

FOREIGN PATENT DOCUMENTS

CA 2255183 C * 9/2004 ............. B23Q 5/046
CN 2749651 Y 1/2006
(Continued)

OTHER PUBLICATIONS

International Search Report and Written Opinion for Application No. PCT/US2020/032800 dated Aug. 25, 2020 (9 pages).
(Continued)

*Primary Examiner* — Erica E Cadugan
(74) *Attorney, Agent, or Firm* — Michael Best & Friedrich LLP

(57) ABSTRACT

The present invention provides, in one aspect, a router including a motor unit and a base configured to selectively receive the motor unit to support the router on a work piece surface. The motor unit includes a motor and a spindle configured to output a torque supplied by the motor. The base includes an input shaft configured to selectively couple to the spindle, an output shaft laterally offset from the input shaft, and a belt. The input shaft includes a first pulley and
(Continued)

the output shaft includes a second pulley and a tool holder. The belt wraps around the first and second pulleys to rotationally couple the input shaft to the output shaft. When the motor unit is received into the base, the spindle couples to the input shaft.

10 Claims, 12 Drawing Sheets

(51) Int. Cl.
    *B23Q 5/10*     (2006.01)
    *B23Q 11/12*     (2006.01)
    *B27C 5/10*     (2006.01)
    *H02K 7/14*     (2006.01)
    *H02K 9/06*     (2006.01)

(52) U.S. Cl.
    CPC .............. *H02K 7/145* (2013.01); *H02K 9/06* (2013.01); *Y10T 409/303976* (2015.01); *Y10T 409/306608* (2015.01)

(58) Field of Classification Search
    CPC ................................ B23C 2255/00–12; Y10T 409/306216–306608; Y10T 409/308176; Y10T 409/3084; Y10T 409/308624; Y10T 279/3487
    USPC ........................ 409/175–182, 210, 214, 218; 144/136.95, 154.5; 279/156
    See application file for complete search history.

(56) References Cited

U.S. PATENT DOCUMENTS

| | | |
|---|---|---|
| 1,899,883 A | 2/1933 | Sacrey et al. |
| 2,183,258 A | 12/1939 | Harman |
| 2,756,785 A | 7/1956 | Godfrey |
| 2,784,976 A | 3/1957 | Ondeck |
| 2,842,173 A | 7/1958 | Turner et al. |
| 2,852,051 A | 9/1958 | Bickner |
| 2,855,963 A | 10/1958 | Potter |
| 2,878,842 A | 3/1959 | Pickersgill |
| 2,960,126 A | 11/1960 | Man |
| 3,111,969 A | 11/1963 | Bivens |
| 3,162,221 A | 12/1964 | Lacey |
| 3,179,136 A | 4/1965 | Santis |
| 3,212,541 A | 10/1965 | Burrows et al. |
| 3,332,462 A | 7/1967 | Williams |
| 3,346,026 A | 10/1967 | Pluchino |
| 3,376,787 A | 4/1968 | Morganson |
| 3,447,001 A | 5/1969 | Zelik |
| 3,454,061 A | 7/1969 | Cordone et al. |
| 3,466,973 A | 9/1969 | Reed |
| 3,489,191 A | 1/1970 | Blevins |
| 3,494,394 A | 2/1970 | Stock |
| 3,494,395 A | 2/1970 | Graham |
| 3,517,712 A | 6/1970 | Selowitz |
| 3,587,387 A | 6/1971 | Burrows et al. |
| 3,635,268 A | 1/1972 | Lange |
| 3,767,948 A | 10/1973 | Batson |
| 3,783,915 A | 1/1974 | Bryden |
| 3,791,260 A | 2/1974 | Ambler et al. |
| 3,810,641 A | 5/1974 | Benjamin |
| 3,811,361 A | 5/1974 | Seely et al. |
| 3,894,743 A | 7/1975 | Hiroumi |
| 3,913,447 A | 10/1975 | Roche |
| 4,022,260 A | 5/1977 | Wilson |
| 4,044,805 A | 8/1977 | Gronholz |
| 4,099,552 A | 7/1978 | Dyball |
| 4,102,370 A | 7/1978 | Vess |
| 4,239,428 A | 12/1980 | Berzina |
| 4,252,164 A | 2/1981 | Norlander |
| 4,272,821 A | 6/1981 | Bradus |
| 4,290,464 A | 9/1981 | Marsan |
| 4,319,615 A | 3/1982 | Ditmanson |
| 4,319,860 A | 3/1982 | Beares |
| 4,445,811 A | 5/1984 | Sanders |
| 4,461,330 A | 7/1984 | Judkins |
| 4,551,047 A | 11/1985 | Price |
| 4,566,512 A | 1/1986 | Wilson |
| 4,640,324 A | 2/1987 | Lounds |
| 4,652,191 A | 3/1987 | Bernier |
| 4,674,548 A | 6/1987 | Mills et al. |
| 4,685,496 A | 8/1987 | Livick |
| 4,750,536 A | 6/1988 | Grisley |
| 4,763,707 A | 8/1988 | Hounshell |
| 4,777,991 A | 10/1988 | Adame |
| 4,821,365 A | 4/1989 | Charters |
| 4,827,996 A | 5/1989 | Cotton et al. |
| 4,858,661 A | 8/1989 | Bosten et al. |
| 4,858,663 A | 8/1989 | Bosten et al. |
| RE33,045 E | 9/1989 | Gronholz et al. |
| 4,921,023 A | 5/1990 | Pempek |
| 4,938,642 A | 7/1990 | Imahashi et al. |
| 4,942,912 A | 7/1990 | Gakhar et al. |
| 4,947,908 A | 8/1990 | O'Banion et al. |
| 4,977,938 A | 12/1990 | Greeson |
| 5,013,195 A | 5/1991 | Strazar |
| 5,013,196 A | 5/1991 | Friegang |
| 5,028,179 A | 7/1991 | Grasset |
| 5,062,460 A | 11/1991 | DeLine |
| 5,074,724 A | 12/1991 | McCracken |
| 5,078,557 A | 1/1992 | McCracken |
| 5,088,865 A | 2/1992 | Beth et al. |
| 5,090,461 A | 2/1992 | Gakhar et al. |
| 5,101,875 A | 4/1992 | Eckhold et al. |
| 5,143,494 A | 9/1992 | McCurry |
| 5,188,492 A | 2/1993 | McCracken |
| 5,191,921 A | 3/1993 | McCurry |
| 5,224,803 A | 7/1993 | Lallier |
| 5,267,129 A | 11/1993 | Anderson |
| 5,305,525 A | 4/1994 | Susnjara et al. |
| 5,311,914 A | 5/1994 | Stornetta |
| 5,320,463 A | 6/1994 | McCurry et al. |
| 5,343,910 A | 9/1994 | Reines |
| 5,353,852 A | 10/1994 | Stolzer et al. |
| 5,370,165 A | 12/1994 | Stornetta |
| 5,452,751 A | 9/1995 | Engler, III et al. |
| 5,464,229 A | 11/1995 | Salpaka |
| 5,503,203 A | 4/1996 | Stornetta |
| 5,509,454 A | 4/1996 | Giacometti |
| 5,590,989 A | 1/1997 | Mulvihill |
| 5,620,188 A | 4/1997 | McCurry et al. |
| 5,669,453 A | 9/1997 | Akazawa |
| 5,671,789 A | 9/1997 | Stolzer et al. |
| 5,755,448 A | 5/1998 | Kanaan et al. |
| 5,772,368 A | 6/1998 | Posh |
| 5,788,248 A | 8/1998 | Gibson |
| 5,820,136 A | 10/1998 | Han et al. |
| 5,826,888 A | 10/1998 | Weaver et al. |
| 5,833,409 A | 11/1998 | Giacometti et al. |
| 5,902,080 A | 5/1999 | Kopras |
| 5,918,652 A | 7/1999 | Tucker |
| 5,918,685 A | 7/1999 | Ulbrich et al. |
| 5,921,563 A | 7/1999 | Huggins et al. |
| 5,944,327 A | 8/1999 | Kannan |
| 5,997,225 A | 12/1999 | Young et al. |
| 5,998,897 A | 12/1999 | Boston et al. |
| 6,027,289 A | 2/2000 | Posh |
| 6,045,306 A | 4/2000 | Buddendeck et al. |
| 6,070,626 A | 6/2000 | Tully |
| 6,079,915 A | 6/2000 | Bosten et al. |
| 6,079,916 A | 6/2000 | Grayson et al. |
| 6,079,918 A | 6/2000 | Buddendeck et al. |
| 6,113,323 A | 9/2000 | Bosten et al. |
| 6,139,229 A | 10/2000 | Bosten et al. |
| 6,145,556 A | 11/2000 | Wood |
| 6,179,512 B1 | 1/2001 | Gibson et al. |
| 6,224,305 B1 | 5/2001 | Huggins |
| 6,244,796 B1 | 6/2001 | Schuebel et al. |
| 6,244,797 B1 | 6/2001 | Wheeler |
| 6,261,036 B1 | 7/2001 | Bosten et al. |
| 6,305,887 B1 | 10/2001 | Wang |

(56) References Cited

U.S. PATENT DOCUMENTS

| | | |
|---|---|---|
| 6,332,619 B1 | 12/2001 | DeRosa |
| 6,350,087 B1 | 2/2002 | Berry et al. |
| 6,390,482 B1 * | 5/2002 | Hanoch ............... B23B 31/1179 |
| | | 279/156 |
| 6,443,675 B1 | 9/2002 | Kopras et al. |
| 6,443,676 B1 | 9/2002 | Kopras |
| 6,474,378 B1 | 11/2002 | Ryan et al. |
| 6,488,455 B1 | 12/2002 | Staebler et al. |
| 6,494,590 B1 | 12/2002 | Paganini et al. |
| 6,520,508 B1 | 2/2003 | Jordan |
| 6,558,090 B2 | 5/2003 | Lagaly et al. |
| 6,558,091 B2 | 5/2003 | Smith et al. |
| 6,568,887 B2 | 5/2003 | Hathcock et al. |
| D479,968 S | 9/2003 | McDonald et al. |
| 6,619,894 B2 | 9/2003 | Hathcock et al. |
| 6,622,762 B2 | 9/2003 | Bergner et al. |
| 6,713,905 B2 | 3/2004 | Hirschburger et al. |
| 6,725,892 B2 | 4/2004 | McDonald et al. |
| 6,726,414 B2 | 4/2004 | Pientka et al. |
| 6,729,414 B2 | 5/2004 | Cooper et al. |
| 6,779,954 B2 | 8/2004 | Tomayko |
| 6,792,984 B2 | 9/2004 | Fontaine |
| 6,835,030 B2 | 12/2004 | Pozgay et al. |
| 6,846,138 B1 | 1/2005 | Phillips et al. |
| 6,851,900 B2 | 2/2005 | Tillemans et al. |
| 6,854,938 B2 | 2/2005 | Kopras et al. |
| 6,880,832 B2 | 4/2005 | DeRosa |
| 6,886,961 B2 | 5/2005 | Hara et al. |
| 6,890,135 B2 | 5/2005 | Kopras et al. |
| 6,896,451 B2 | 5/2005 | Oberheim |
| 6,896,454 B2 | 5/2005 | Gerhardt et al. |
| 6,913,429 B1 | 7/2005 | Phillips et al. |
| 6,918,720 B2 | 7/2005 | Kopras et al. |
| 6,932,129 B2 | 8/2005 | Hess et al. |
| 6,932,357 B2 | 8/2005 | Jacobs et al. |
| 6,939,213 B2 | 9/2005 | Lovchik et al. |
| 6,948,892 B2 | 9/2005 | Hummel |
| 6,951,232 B2 | 10/2005 | McDonald et al. |
| 6,991,008 B2 | 1/2006 | McDonald et al. |
| 6,997,222 B2 | 2/2006 | Rosendahl |
| 7,018,149 B2 | 3/2006 | Freese et al. |
| 7,073,993 B2 | 7/2006 | Cooper et al. |
| 7,080,964 B2 | 7/2006 | Riley et al. |
| 7,089,978 B2 | 8/2006 | Karkosch et al. |
| 7,089,979 B2 | 8/2006 | Cooper et al. |
| 7,094,011 B2 | 8/2006 | Kopras et al. |
| 7,101,058 B2 | 9/2006 | Prell et al. |
| 7,108,464 B2 | 9/2006 | Cooper et al. |
| 7,114,538 B2 | 10/2006 | Rosendahl |
| 7,131,180 B2 | 11/2006 | Kopras et al. |
| 7,140,817 B1 | 11/2006 | Phillips et al. |
| 7,207,362 B2 | 4/2007 | McDonald et al. |
| 7,273,080 B2 | 9/2007 | Baber |
| 7,275,900 B1 | 10/2007 | Phillips et al. |
| 7,290,574 B2 | 11/2007 | Baber |
| 7,290,575 B2 | 11/2007 | Freese et al. |
| 7,290,967 B2 | 11/2007 | Steimel et al. |
| 7,303,364 B2 | 12/2007 | Cooper et al. |
| 7,316,528 B2 | 1/2008 | Cooper et al. |
| 7,316,529 B2 | 1/2008 | Phillips et al. |
| 7,334,613 B2 | 2/2008 | Griffin et al. |
| 7,334,614 B2 | 2/2008 | Cooper et al. |
| 7,337,812 B2 | 3/2008 | Williams |
| 7,343,945 B2 | 3/2008 | Schelberg et al. |
| 7,367,760 B2 | 5/2008 | Onose et al. |
| 7,370,679 B2 | 5/2008 | McDonald et al. |
| 7,402,008 B2 | 7/2008 | Phillips et al. |
| 7,438,095 B2 | 10/2008 | Hessenberger et al. |
| 7,448,420 B2 | 11/2008 | Mair |
| 7,451,791 B2 | 11/2008 | Cooper et al. |
| 7,455,488 B2 | 11/2008 | Carlson et al. |
| 7,467,651 B2 | 12/2008 | Karkosch et al. |
| 7,473,058 B2 | 1/2009 | Zhu |
| 7,484,915 B2 | 2/2009 | Robson |
| 7,497,649 B2 | 3/2009 | Zhong |
| 7,523,772 B2 | 4/2009 | McDonald et al. |
| 7,524,151 B2 | 4/2009 | Zhu |
| 7,552,749 B2 | 6/2009 | Kageler et al. |
| 7,556,070 B2 | 7/2009 | McDonald et al. |
| 7,568,288 B2 | 8/2009 | Baker |
| 7,578,325 B2 | 8/2009 | Freese et al. |
| 7,637,294 B2 | 12/2009 | Hessenberger et al. |
| 7,654,294 B2 | 2/2010 | Cooper et al. |
| 7,669,620 B2 | 3/2010 | McDonald et al. |
| 7,677,280 B2 | 3/2010 | McDonald et al. |
| 7,677,281 B2 | 3/2010 | Baker et al. |
| 7,686,046 B2 | 3/2010 | Griffin et al. |
| 7,726,918 B2 | 6/2010 | Onose et al. |
| 7,766,586 B2 | 8/2010 | DeRosa |
| 7,784,507 B2 | 8/2010 | Gass et al. |
| 7,815,356 B2 | 10/2010 | Lutz et al. |
| 7,850,325 B2 | 12/2010 | Wall et al. |
| 7,854,054 B2 | 12/2010 | Kopras et al. |
| 7,871,227 B2 | 1/2011 | Adamczak et al. |
| 7,900,661 B2 | 3/2011 | Thorson et al. |
| 7,900,662 B2 | 3/2011 | Wall et al. |
| 7,905,260 B2 | 3/2011 | Keenan |
| 7,921,887 B2 | 4/2011 | Ellery et al. |
| 7,921,889 B2 | 4/2011 | Pozgay et al. |
| 7,931,054 B2 | 4/2011 | Pozgay et al. |
| 7,946,318 B2 | 5/2011 | Carroll |
| 7,950,882 B2 | 5/2011 | Zaiser et al. |
| 7,971,611 B1 | 7/2011 | Wells |
| 7,975,737 B2 | 7/2011 | Griffin et al. |
| 7,984,734 B2 | 7/2011 | Cepress et al. |
| 8,007,212 B2 | 8/2011 | Zaiser et al. |
| 8,033,307 B2 | 10/2011 | Pozgay et al. |
| 8,042,966 B2 | 10/2011 | Lutz et al. |
| 8,047,242 B2 | 11/2011 | Wall et al. |
| 8,066,041 B2 | 11/2011 | Pozgay et al. |
| 8,079,389 B2 | 12/2011 | Shepherd |
| 8,087,437 B2 | 1/2012 | Goddard et al. |
| 8,109,304 B2 | 2/2012 | Alves |
| 8,146,629 B2 | 4/2012 | Robson |
| 8,317,350 B2 | 11/2012 | Friedman et al. |
| 8,328,381 B2 | 12/2012 | Dixon et al. |
| 8,393,835 B2 | 3/2013 | Wasielewski |
| 8,408,259 B2 | 4/2013 | Pozgay et al. |
| 8,496,366 B2 | 7/2013 | Leong |
| 8,506,108 B2 | 8/2013 | Friedman et al. |
| 8,545,143 B2 | 10/2013 | Liu |
| 8,607,833 B2 | 12/2013 | Pozgay et al. |
| 8,628,280 B2 | 1/2014 | Ceroll et al. |
| 8,678,725 B2 | 3/2014 | Ceroll et al. |
| 8,747,036 B2 | 6/2014 | Kato et al. |
| 8,820,955 B2 | 9/2014 | Dixon et al. |
| 8,827,483 B2 | 9/2014 | Dixon et al. |
| 8,851,812 B1 | 10/2014 | DeRosa |
| 9,022,705 B2 | 5/2015 | Shibata et al. |
| 9,026,242 B2 | 5/2015 | Rivers et al. |
| 9,028,088 B2 | 5/2015 | Vanko et al. |
| 9,144,919 B2 | 9/2015 | Cui et al. |
| 9,174,283 B2 | 11/2015 | Timmons et al. |
| 9,238,270 B2 | 1/2016 | Ceroll et al. |
| 9,242,355 B2 | 1/2016 | Sergyeyenko et al. |
| 9,302,406 B2 | 4/2016 | Kato et al. |
| 9,328,915 B2 | 5/2016 | Vanko et al. |
| 9,333,669 B2 | 5/2016 | Okouchi et al. |
| 9,346,144 B2 | 5/2016 | Tan |
| 9,352,458 B2 | 5/2016 | Friedman et al. |
| 9,393,628 B1 | 7/2016 | Discant |
| 9,403,221 B2 | 8/2016 | Reinwald et al. |
| 9,469,044 B2 | 10/2016 | Krause |
| 9,492,875 B2 | 11/2016 | Ceroll et al. |
| 9,527,200 B2 | 12/2016 | Okouchi et al. |
| 9,539,691 B2 | 1/2017 | Hirschburger |
| 9,573,257 B2 | 2/2017 | Kynast et al. |
| 9,579,761 B2 | 2/2017 | Krause |
| 9,644,837 B2 | 5/2017 | Vanko et al. |
| 9,669,534 B2 | 6/2017 | Okouchi et al. |
| 9,724,767 B2 | 8/2017 | Ceroll et al. |
| 10,040,181 B2 | 8/2018 | Fu et al. |
| 10,173,307 B2 | 1/2019 | Sergyeyenko et al. |
| 10,174,934 B2 | 1/2019 | Padget et al. |

(56) References Cited

U.S. PATENT DOCUMENTS

| | | |
|---|---|---|
| 2002/0197123 A1 | 12/2002 | Kopras et al. |
| 2003/0056853 A1 | 3/2003 | Gass et al. |
| 2003/0113180 A1 | 6/2003 | Schelberg et al. |
| 2004/0029509 A1* | 2/2004 | Paci ................ B23Q 5/046 451/442 |
| 2004/0035495 A1 | 2/2004 | Hessenberger et al. |
| 2005/0115639 A1 | 6/2005 | Bagnall |
| 2005/0139288 A1 | 6/2005 | Mair |
| 2005/0200087 A1 | 9/2005 | Vasudeva et al. |
| 2005/0244240 A1 | 11/2005 | Sheffield |
| 2005/0260052 A1 | 11/2005 | Lovchik et al. |
| 2006/0046625 A1 | 3/2006 | Andreas |
| 2006/0102249 A1 | 5/2006 | Cooper et al. |
| 2006/0151189 A1 | 7/2006 | Wu |
| 2006/0157155 A1 | 7/2006 | Robinson |
| 2006/0191595 A1 | 8/2006 | Stoffel |
| 2006/0191597 A1 | 8/2006 | Cooper et al. |
| 2007/0113927 A1 | 5/2007 | Zhong |
| 2008/0152450 A1 | 6/2008 | Zaiser et al. |
| 2008/0283147 A1 | 11/2008 | Cooper et al. |
| 2009/0114312 A1 | 5/2009 | Cooper et al. |
| 2010/0018609 A1 | 1/2010 | Van Der Linde et al. |
| 2010/0071921 A1 | 3/2010 | Canino et al. |
| 2010/0072833 A1 | 3/2010 | Canino et al. |
| 2010/0074700 A1 | 3/2010 | Canino et al. |
| 2011/0058356 A1 | 3/2011 | Friedman et al. |
| 2011/0073335 A1 | 3/2011 | Kato et al. |
| 2011/0121522 A1 | 5/2011 | DeRosa |
| 2012/0169017 A1 | 7/2012 | Mack |
| 2012/0241047 A1 | 9/2012 | Kato et al. |
| 2012/0241049 A1 | 9/2012 | Kato et al. |
| 2014/0201926 A1 | 7/2014 | Lin |
| 2015/0094836 A1 | 4/2015 | Rivers et al. |
| 2015/0277421 A1 | 10/2015 | Rivers et al. |
| 2016/0291567 A1 | 10/2016 | Rivers et al. |
| 2016/0291568 A1 | 10/2016 | Rivers et al. |
| 2016/0291569 A1 | 10/2016 | Rivers et al. |
| 2016/0318204 A1 | 11/2016 | Truesdale et al. |
| 2017/0203421 A1 | 7/2017 | Vanko et al. |
| 2017/0225315 A1 | 8/2017 | Okouchi et al. |
| 2017/0326654 A1 | 11/2017 | Ceroll et al. |

FOREIGN PATENT DOCUMENTS

| | | |
|---|---|---|
| CN | 202053317 U | 11/2011 |
| CN | 203510365 U | 4/2014 |
| CN | 103878419 A | 6/2014 |
| CN | 203681482 U | 7/2014 |
| CN | 205437248 U | 8/2016 |
| CN | 205938750 U | 2/2017 |
| CN | 110053106 A | 7/2019 |
| DE | 7827496 U1 | 3/1980 |
| DE | 3022233 A1 | 12/1981 |
| DE | 8609919 U1 | 6/1986 |
| DE | 8802583 U1 | 6/1989 |
| DE | 8903450 U1 | 8/1989 |
| DE | 8902132 U1 | 6/1990 |
| DE | 3917812 A1 | 12/1990 |
| DE | 4407081 A1 | 9/1994 |
| DE | 9422037 U1 | 9/1997 |
| DE | 10046814 A1 | 4/2002 |
| DE | 102005053534 A1 | 5/2007 |
| DE | 202006009078 U1 | 10/2007 |
| DE | 202010006818 U1 | 11/2010 |
| DE | 202010006819 U1 | 11/2010 |
| DE | 102011075663 A1 | 11/2012 |
| DE | 202013100420 U1 | 3/2013 |
| DE | 102012205274 A1 | 10/2013 |
| DE | 102012223910 A1 | 6/2014 |
| DE | 102015223659 A1 | 6/2017 |
| DE | 102015225127 A1 | 6/2017 |
| DE | 102016225719 A1 | 6/2018 |
| EP | 0265403 A1 | 4/1988 |
| EP | 0150045 B1 | 9/1988 |
| EP | 0469538 A1 | 2/1992 |
| EP | 0473035 A2 | 3/1992 |
| EP | 0676264 A1 | 10/1995 |
| EP | 0625393 B1 | 8/2002 |
| EP | 3189949 A1 | 7/2017 |
| EP | 3369539 A1 | 9/2018 |
| GB | 2287217 A * | 9/1995 |
| JP | 2005118912 A | 5/2005 |
| JP | 2009012153 A | 1/2009 |
| JP | 2018079632 A | 5/2018 |
| WO | WO9532830 A1 | 12/1995 |
| WO | WO2000003848 A1 | 1/2000 |
| WO | WO2006050653 A1 | 5/2006 |
| WO | WO2007093857 A1 | 8/2007 |
| WO | 2009018499 A1 | 2/2009 |
| WO | WO2011004902 A1 | 1/2011 |
| WO | WO2011013852 A1 | 2/2011 |
| WO | WO2011013853 A2 | 2/2011 |
| WO | WO2016089834 A1 | 6/2016 |
| WO | WO2016173987 A1 | 11/2016 |
| WO | WO2017207995 A1 | 12/2017 |
| WO | WO2018114893 A1 | 6/2018 |

OTHER PUBLICATIONS

Electric Hand Grinder Deals, "Best Buy Milwaukee 49-12-0362 Angle Grinder Guard for Type 1 Grinding Angle Grinder Discs 5-Inch Online Shop," <https://electrichandgrinderdeals.blogspot.com/2012/03/milwaukee-49-12-0362-angle-grinder.html> web page publicly available at least as early as Nov. 1, 2020.

Milwaukee Electric Tool Corporation, "Cordless 18 Volt 4-1/2" Cut-off/Grinder, Service Parts List, Jan. 2009 (2 pages).

Extended European Search Report for Application No. 20805568.1 dated Dec. 13, 2022 (9 pages).

* cited by examiner

US 12,285,881 B2

OFFSET BASE FOR ROUTER

CROSS-REFERENCE TO RELATED APPLICATIONS

This application is a national stage filing under 35 U.S.C. § 371 of International Application No. PCT/US2020/032800 filed May 14, 2020, which claims foreign priority to Chinese Utility Model application No. 202020132856.5 filed Jan. 20, 2020, now Pat. No. ZL202020132856.5, and which claims priority to U.S. Provisional Patent Application No. 62/848,254 filed May 15, 2019, the entire contents of which are hereby incorporated by reference.

FIELD OF THE INVENTION

The present invention relates to power tools, and more particularly to powered rotary cutting tools.

BACKGROUND OF THE INVENTION

Trim routers typically include a motor unit insertable into one or more base units (e.g., a fixed base, a plunge base, an offset base, etc.) to form a router assembly. Many of the offset bases currently available for trim routers utilize a belt and a pulley integral to the output spindle of the motor unit of the router assembly. To operate such offset bases, the pulley must be installed on the motor unit before the motor unit can be inserted into the offset base. Moreover, the belt can only be looped around the pulley after the motor unit has been inserted into the offset base. Often the final step of looping the belt onto the pulley is difficult and time consuming due to the space constraints and limited accessibility to the pulley.

SUMMARY OF THE INVENTION

The present invention provides, in one aspect, a router including a motor unit and a base configured to selectively receive the motor unit to support the router on a work piece surface. The motor unit includes a motor and a spindle configured to output a torque supplied by the motor. The base includes an input shaft configured to selectively couple to the spindle, an output shaft laterally offset from the input shaft, and a belt. The input shaft includes a first pulley and the output shaft includes a second pulley and a tool holder. The belt wraps around the first and second pulleys to rotationally couple the input shaft to the output shaft. When the motor unit is received into the base, the spindle couples to the input shaft.

In another independent aspect, the present invention provides a router including a motor unit and a base configured to selectively receive the motor unit to support the router on a work piece surface. The motor unit includes a motor and a spindle configured to output a torque supplied by the motor. The base includes an output shaft laterally offset from the spindle when the motor unit is received into the base, the output shaft including a tool holder. The base also includes a fan configured to generate airflow within the base.

In another independent aspect, the present invention provides a router including a motor unit and a base configured to selectively receive the motor unit to support the router on a work piece surface. The motor unit includes a motor and a spindle configured to output a torque supplied by the motor. The base includes a housing, an input shaft including a first pulley, an output shaft including a second pulley and a tool holder, a belt, and a fan. The input shaft is rotatably supported within the housing and is configured to selectively couple to the spindle. The output shaft is rotatably supported within the housing at a location laterally offset from the input shaft. The belt wraps around the first and second pulleys to rotationally couple the input shaft to the output shaft. The fan is coupled for co-rotation with the output shaft to induce an airflow through the housing. When the motor unit is received into the base, the spindle is coupled to the input shaft without removing the belt from the first pulley.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
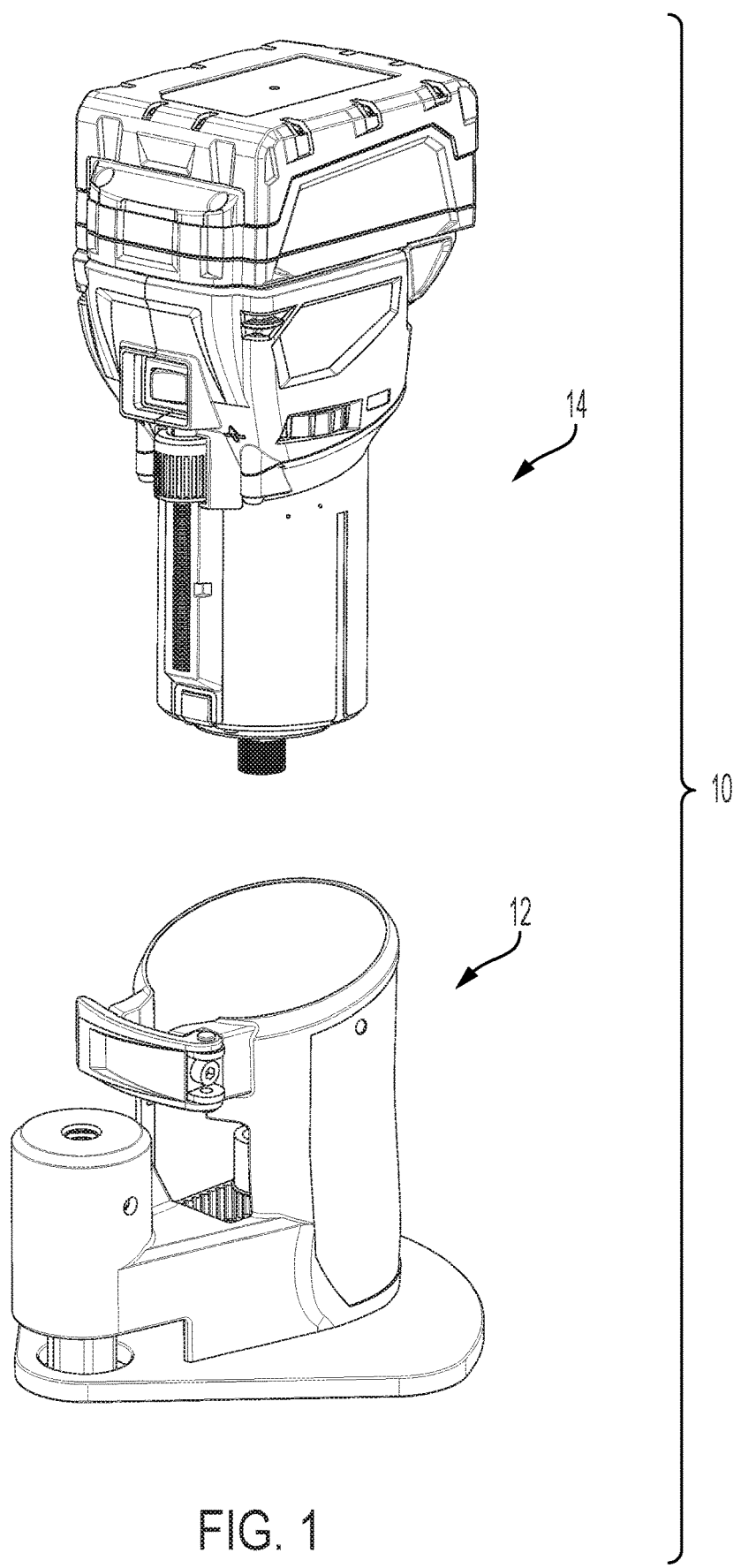
FIG. 1 is a perspective view of a router including a motor unit and a base.

FIG. 1 illustrates a hand-held router 10 according to one embodiment of the invention. The router 10 includes a base 12 and a motor unit 14 supported by the base 12. The motor unit 14 includes a motor 16 operable to drive a tool element (not shown) to cut a workpiece. In the illustrated construction, the base 12 is configured as an offset base.

Figure 2:
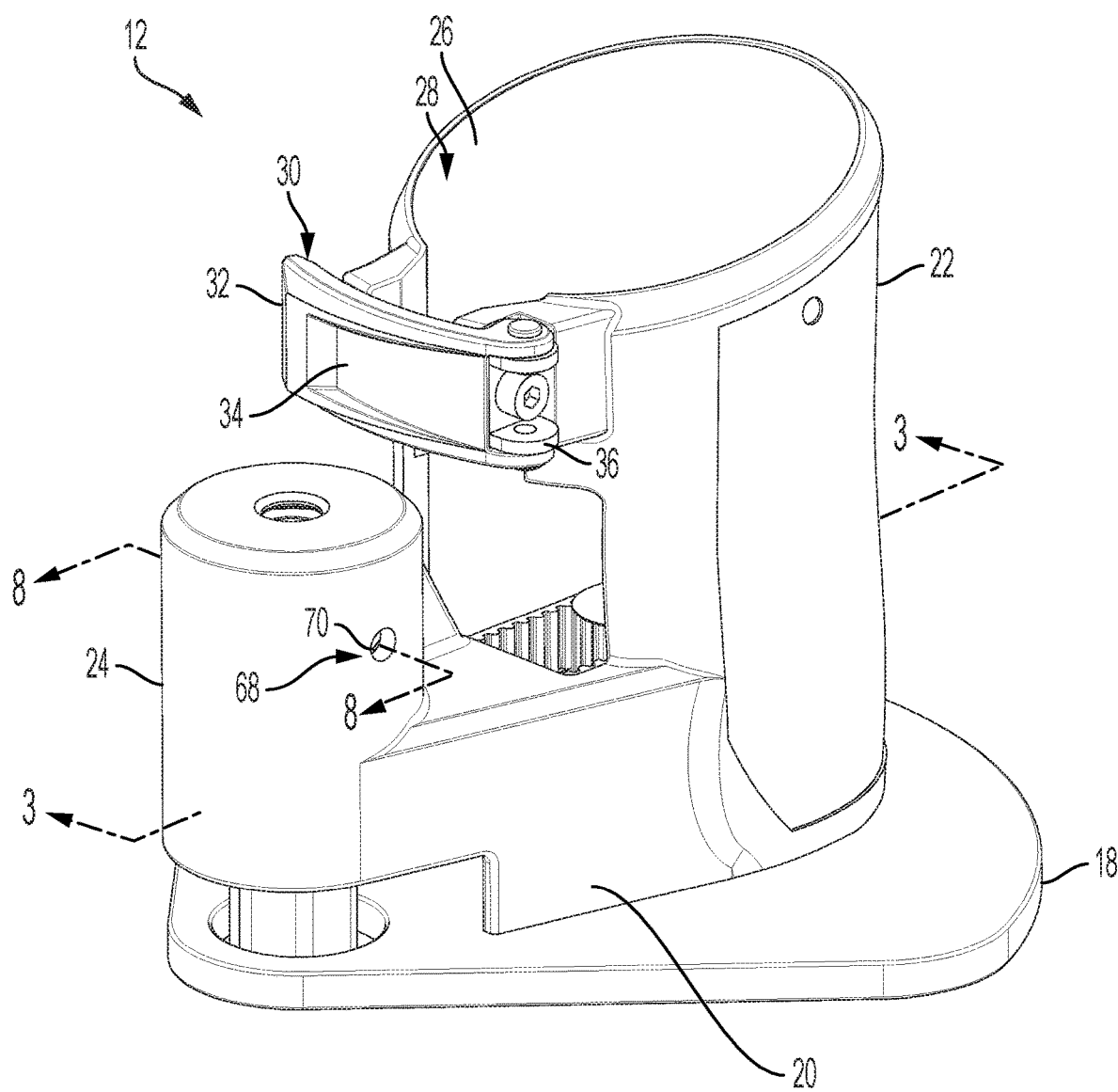
FIG. 2 is a perspective view of the base of FIG. 1.
Figure 3:
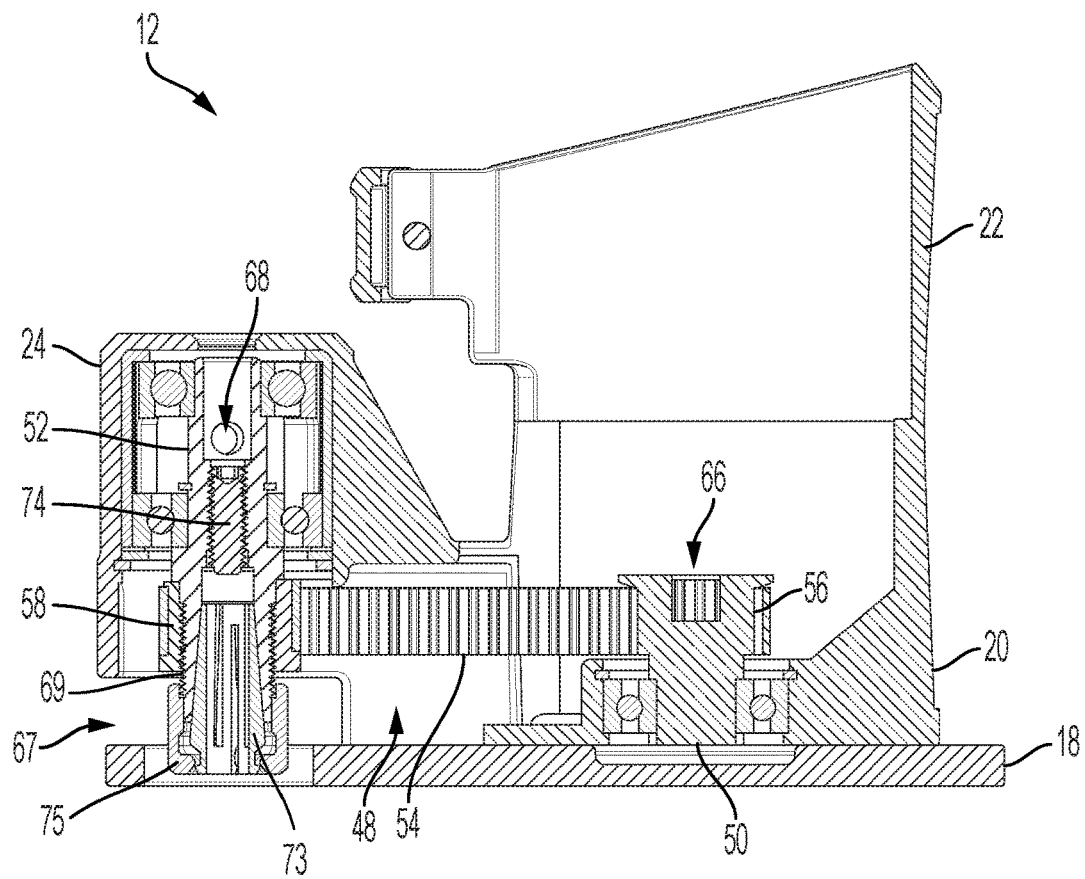
FIG. 3 is a cross-sectional view of the base of FIG. 1, taken along line 3-3 of FIG. 2.

As shown in FIGS. 2 and 3, the base 12 includes a sub-base or base plate 18 configured to interface with a work surface, such as a surface of the workpiece. The base 12 also includes a base housing 20 having a generally cylindrical annular sleeve 22 and an offset housing portion 24 integrally formed with the sleeve 22 and laterally offset therefrom. In the illustrated embodiment, the base housing 20 is fastened to the base plate 18, but in other embodiments (not shown), the base housing 20 may be formed integrally with the base plate 18.

The sleeve 22 of the base 12 extends upwardly from the base plate 18 and includes a generally cylindrical inner surface 26 for interfacing with the motor unit 14. The sleeve 22 is resilient and is open on one side at a vertical seam 28. As a result, the inner diameter of the sleeve 22 may be increased or decreased by opening or partially closing, respectively, the seam 28. The resilience of the sleeve 22 results in the seam 28 being partially open when no force is applied to close the seam 28.

With continued reference to FIGS. 2 and 3, the base 12 includes a clamping mechanism 30 to control the opening and closing of the seam 28. When the seam 28 is partially closed, the base 12 is in a clamped state, in which the motor unit 14 is retained in a fixed position relative to the base 12. When the seam 28 is open, the base 12 is in a released state, in which the motor unit 14 can be inserted into or removed from the base 12. The clamping mechanism 30 includes an actuator or clamp handle 32 having a gripping portion 34 and a cam portion 36. The clamp handle 32 is rotatable to partially close or open the seam 28, and thereby reconfigure the base 12 between the clamped state and the released state.

Figure 5:
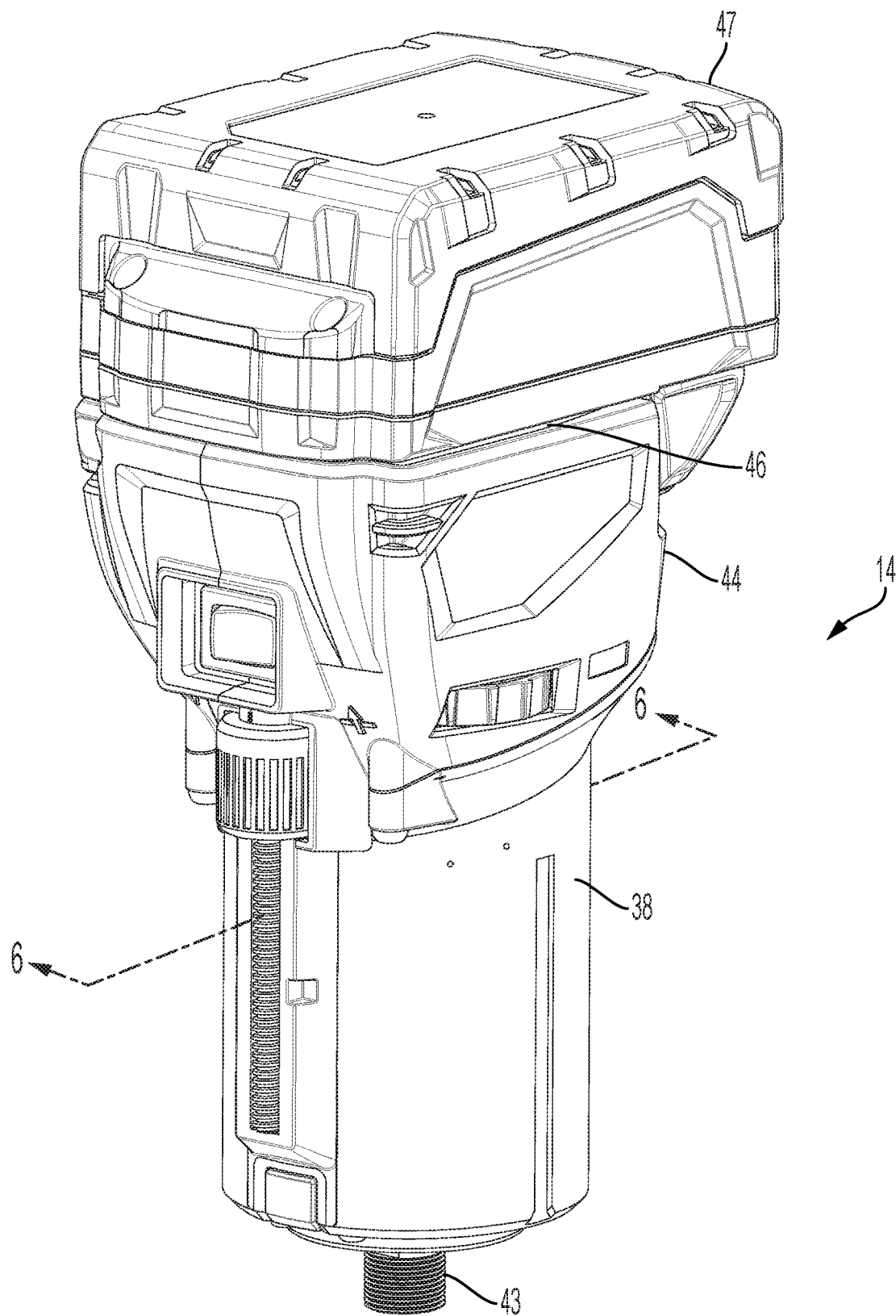
FIG. 5 is a perspective view of the motor unit of FIG. 1.
Figure 6:
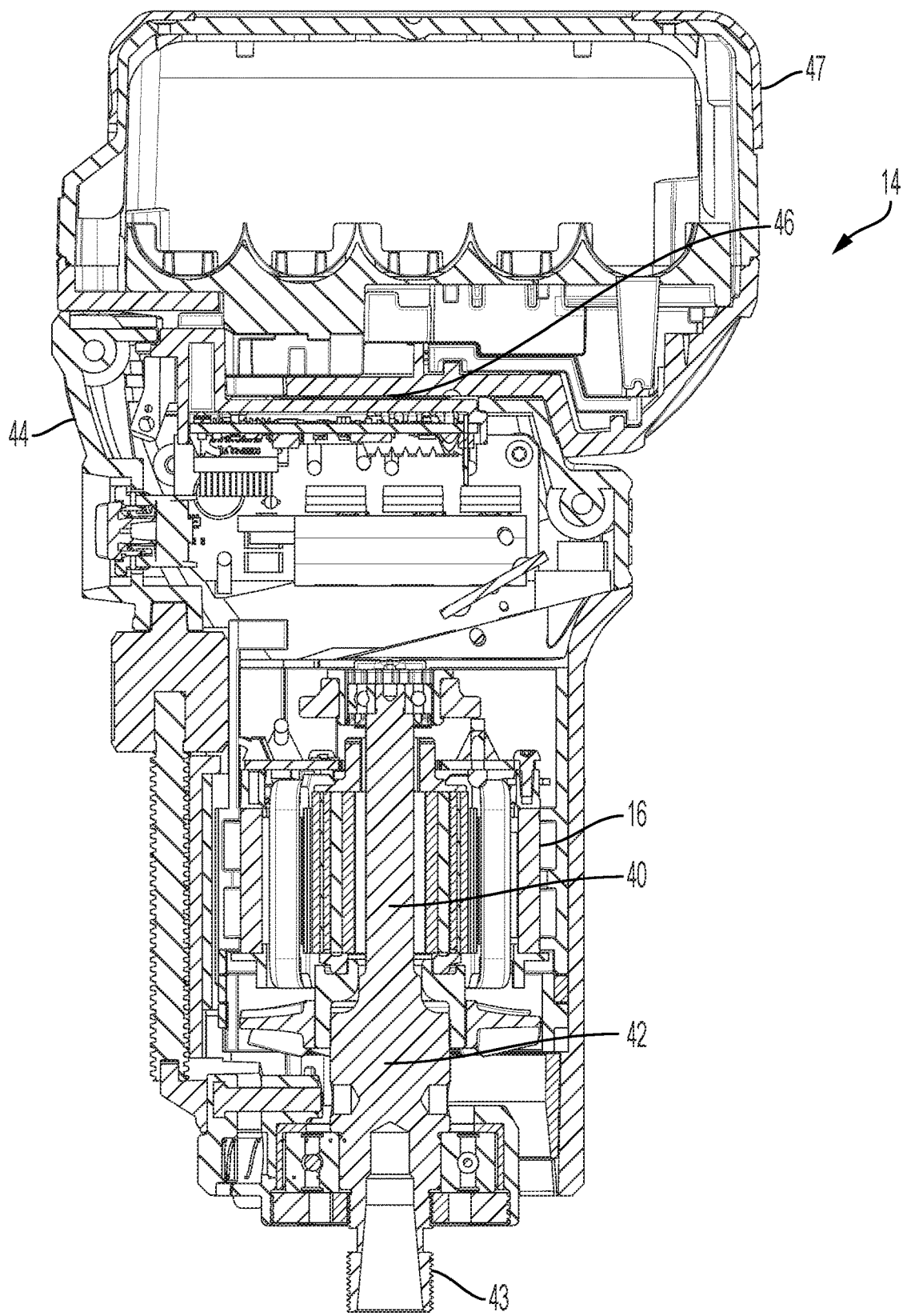
FIG. 6 is a cross-sectional view of the motor unit of FIG. 1, taken along line 6-6 of FIG. 5

With reference to FIGS. 5 and 6, the motor unit 14 is generally vertically oriented and has a generally cylindrical outer surface 38. The motor unit 14 supports the motor 16 and associated components. The motor 16 includes a motor shaft 40, and a portion of the motor shaft 40 defines a spindle 42 extending outward from the motor unit 14. The spindle 42 is configured to selectively couple to a tool holder (e.g., a collet and nut assembly) configured to support the tool element. The tool holder includes a threaded end 43 of the spindle 42, a collet (not shown) in which the tool element is received, and a nut (not shown) threaded to the threaded end 43 of the spindle 42.

The motor unit 14 also defines a handle portion 44 configured to be grasped by a user. The handle portion 44 defines a battery receptacle 46, which is positioned on an end of the handle portion 44 opposite the spindle 42. The battery receptacle 46 is configured to selectively mechanically and electrically connect to a rechargeable battery pack 47 for powering the motor 16. The battery pack 47 may include any of a number of different nominal voltages (e.g., 12V, 18V, etc.), and may be configured having any of a number of different chemistries (e.g., lithium-ion, nickel-cadmium, etc.). In alternative embodiments (not shown), the motor 16 may be powered by a remote power source (e.g., a household electrical outlet) through a power cord.

Figure 7:
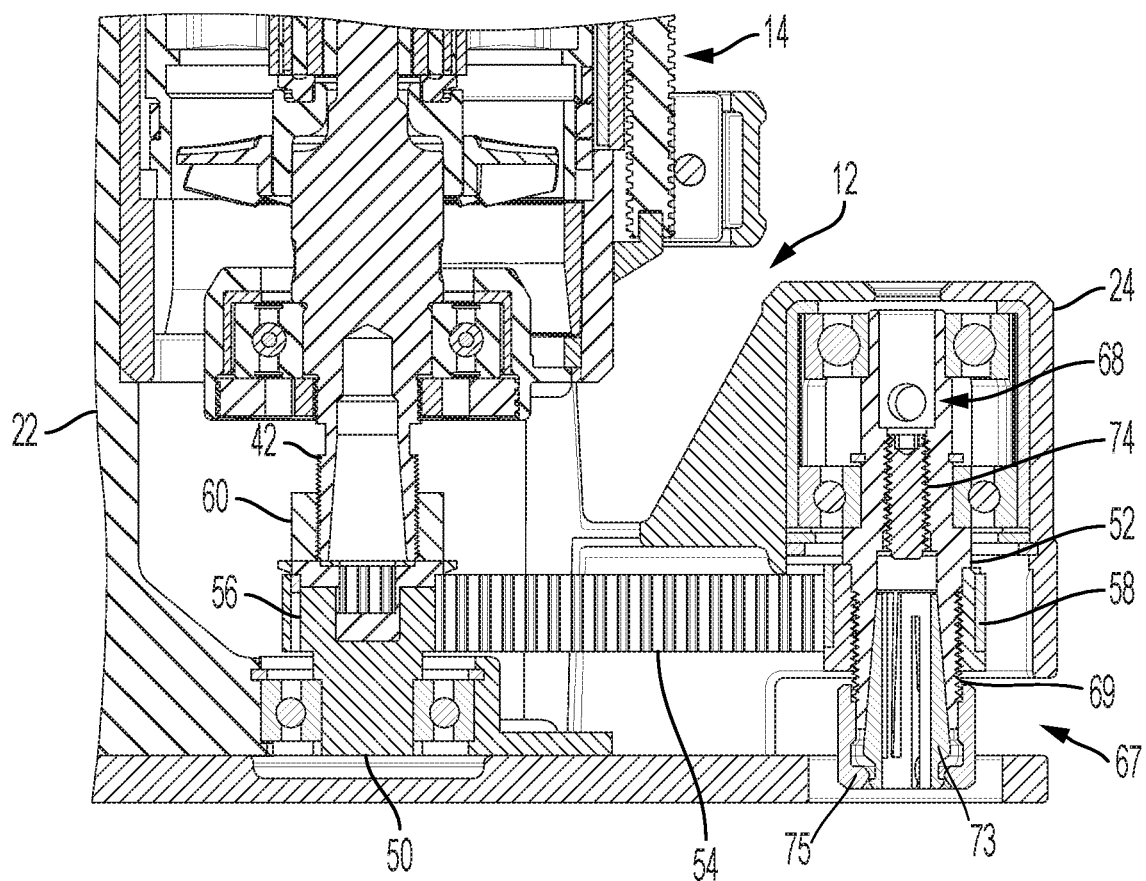
FIG. 7 is a cross-sectional view of portions of the router of FIG. 1, illustrating the motor unit received into the base.

As shown in FIG. 7, the motor unit 14 is arranged to fit within the sleeve 22 and to be vertically fixed relative to the sleeve 22. Closing the seam 28 using the clamping mechanism 30, as described above, causes the inner surface 26 (FIG. 2) of the sleeve 22 to clamp the outer surface 38 (FIG. 5) of the motor unit 14 to secure the motor unit 14 at a fixed position (i.e., height) relative to the base 12. Opening the seam 28 releases the motor unit 14 and allows the motor unit 14 to be removed from the base 12.

Referring back to FIG. 3, the base 12 further includes a drivetrain 48 having an input shaft 50, an output shaft 52, and a belt 54 (e.g., a synchronous belt) that rotatably couples the input shaft 50 to the output shaft 52. The drivetrain 48 also includes a first pulley 56 coupled for co-rotation with the input shaft 50 and a second pulley 58 coupled for co-rotation with the output shaft 52. The belt 54 engages and rotatably couples the first and second pulleys 56, 58 to transfer torque from the input shaft 50 to the output shaft 52.

In this regard, the first and second pulleys 56, 58, and the belt 54, are included as integral components of the base 12, such that the pulleys 56, 58 and the belt 54 remain with the base 12 when the motor unit 14 is removed from the base 12. Prior-art offset bases for trim routers typically utilize a pulley integral to the output spindle of the motor unit, requiring the user to manually wrap the belt around the pulley after the router is inserted into the offset base. In contrast, with the base 12, the belt 54 remains wrapped around the pulleys 56, 58 at all times, obviating the need to remove and/or attach the belt 54 to the motor unit 14 when it is inserted or removed from the base 12.

Figure 4:
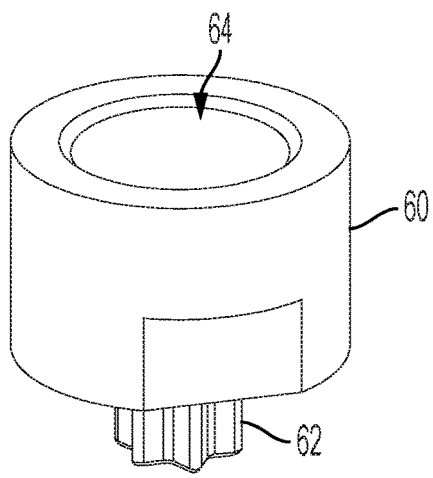
FIG. 4 is a perspective view of an adapter bit of the router of FIG. 1.

The input shaft 50 is rotatably supported within the sleeve 22 of the base 12. When the motor unit 14 is inserted into the base 12, the spindle 42 rotatably couples to the input shaft 50. Specifically, in the illustrated embodiment, the router 10 includes an adapter bit 60 (FIG. 4), which can be threaded to the threaded end 43 of the spindle 42 after the collet and nut are removed, to facilitate quick-attachment and quick-removal between the base 12 and the motor unit 14. The adapter bit 60 includes a male connection member 62 and a threaded bore 64 into which the threaded end 43 of the spindle 42 is received. In turn, the input shaft 50 defines a female hub 66 (FIG. 3) having a shape corresponding to that of the male connection member 62. When the motor unit 14 is inserted into the base 12, the male connection member 62 of the adapter bit 60 engages the female hub 66 (e.g., by a nominal slip-fit) as shown in FIG. 7 to rotationally unitize the spindle 42 and the input shaft 50. In alternative embodiments (not shown), the arrangement may be reversed, such that the adapter bit 60 defines the female hub and the input shaft 50 includes the male connection member.

Referring once more to FIG. 3, the output shaft 52 is rotatably supported within the offset housing portion 24 of the base 12. The output shaft 52 includes a tool holder 67 that receives and supports a tool element (not shown). The tool holder 67 includes a threaded end 69 of the output shaft 52, a collet 73 in which the tool element is received, and a nut 75 threaded to the threaded end 69 of the output shaft 52. When threaded onto the threaded end 69 of the output shaft 52, the nut 75 applies an axial clamping force to the collet 73, which is then converted to a radial clamping force on the collet 73 to clamp the tool element within the collet 73.

To operate the motor unit 14 with the base 12, the adapter bit 60 is attached to the spindle 42 by tightening the threaded bore 64 onto the threaded end of the spindle 42. With the base 12 in the released state (i.e., with the seam 28 open), the motor unit 14 is inserted into the sleeve 22 so that the male connection member 62 engages the female hub 66 of the input shaft 50. The clamp handle 32 is rotated to partially close the seam 28 and place the base 12 in the clamped state, and thereby secure the motor unit 14 within the base 12. The motor 16 is activated to rotate the spindle 42, and rotation of the spindle 42 drives the input shaft 50. Torque is transferred from the input shaft 50 to the output shaft 52 via the belt 54 to drive a tool element (not shown) attached to the tool holder 67. In this way, the offset base permits cuts to be made in the workpiece at locations that may be difficult or impossible for a traditional router to access (e.g., locations proximate edges, corners, or other obstructions).

Figure 8:
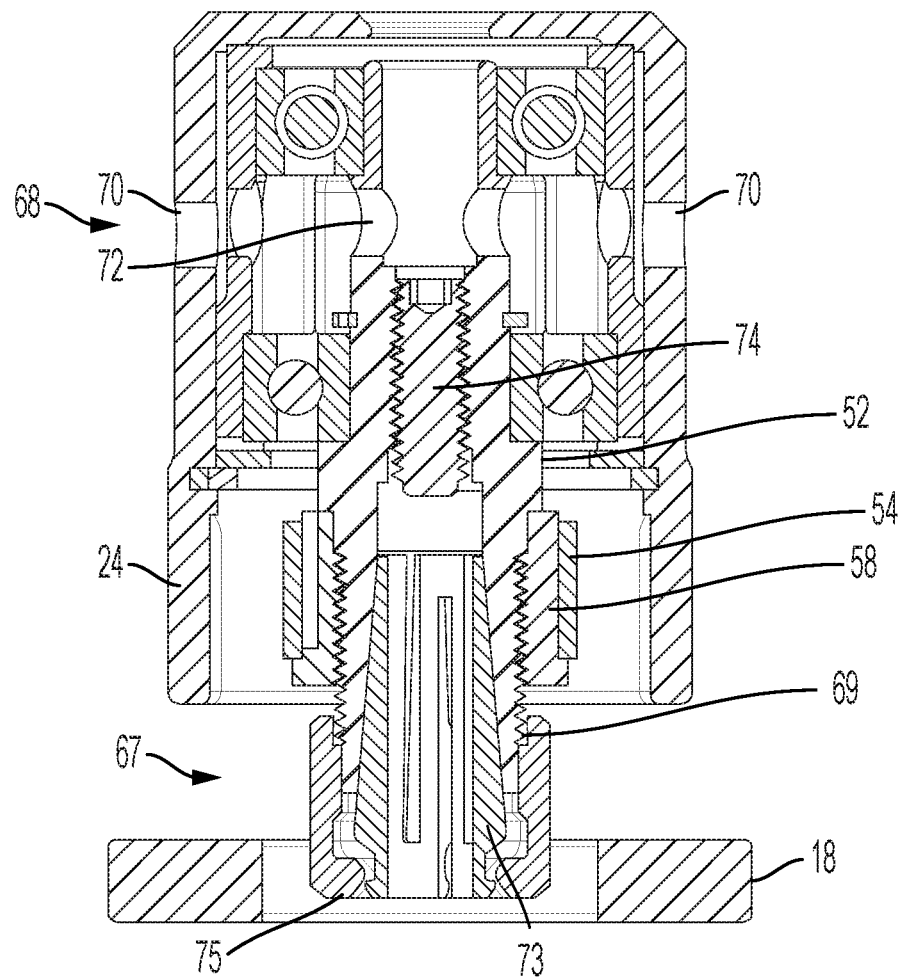
FIG. 8 is another cross-sectional view of the base of FIG. 1, taken along line 8-8 of FIG. 2.

With reference to FIG. 8, the base 12 also includes a keyway 68 including a pair of first openings 70 defined in the offset housing portion 24, and a corresponding second opening 72 defined in the output shaft 52 proximate the first openings 70. Spindle lock is achieved by inserting a tool (e.g., an Allen key: not shown) into the keyway 68 and through at least one of the first and second openings 70, 72, to prevent the output shaft 52 from rotating as the tool holder 67 is loosened or tightened to remove or insert a tool element, respectively.

The output shaft 52 also includes an adjustable set screw 74 rotatable relative to the output shaft 52 to adjust a cutting depth of the tool element. The set screw 74 resides within a central bore of the output shaft 52. The set screw 74 may be rotated to move toward or away from the tool holder 67 along the vertical direction, thereby increasing or decreasing an extent to which the tool element may be inserted into the tool holder 67.

Figure 9:
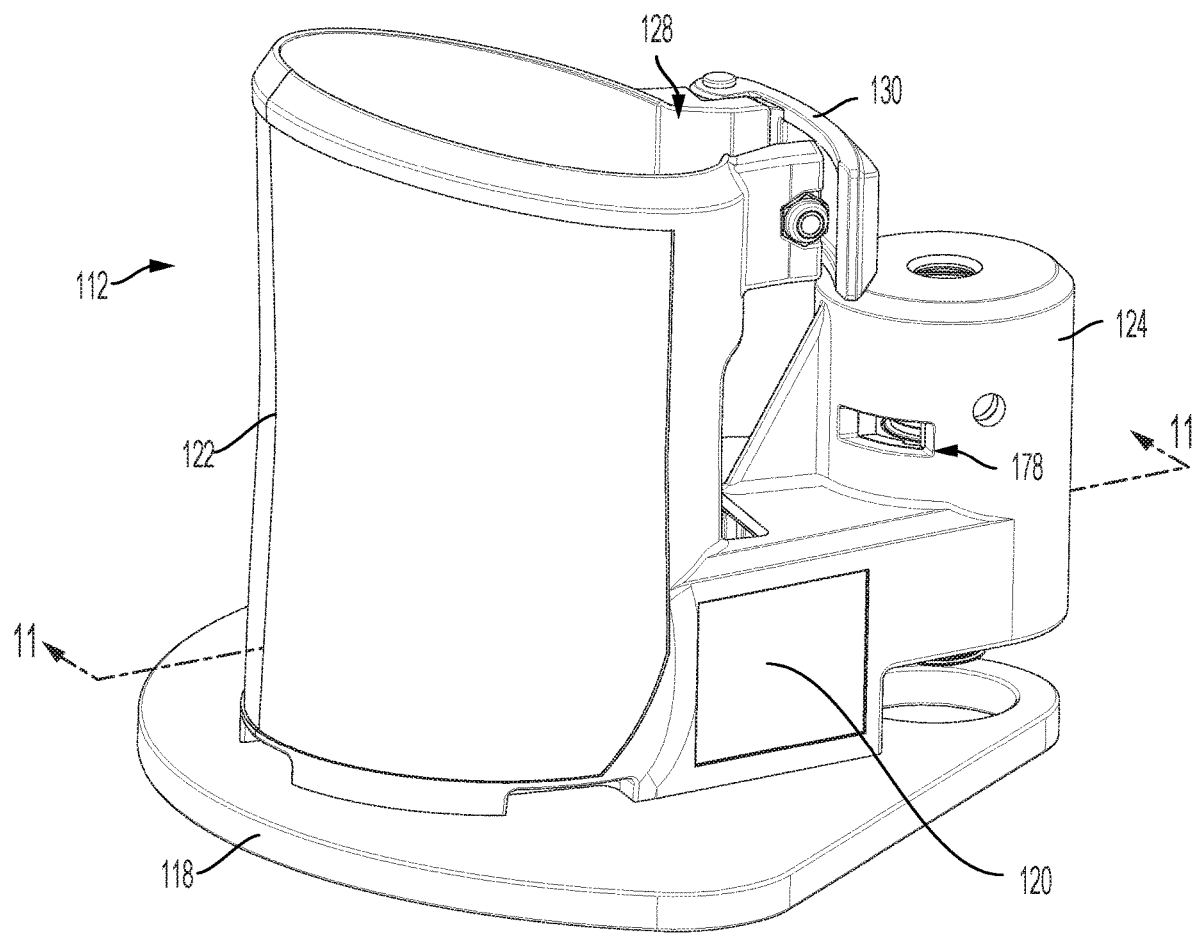
FIG. 9 is a perspective view of a base for use with the motor unit of FIG. 1.
Figure 10:
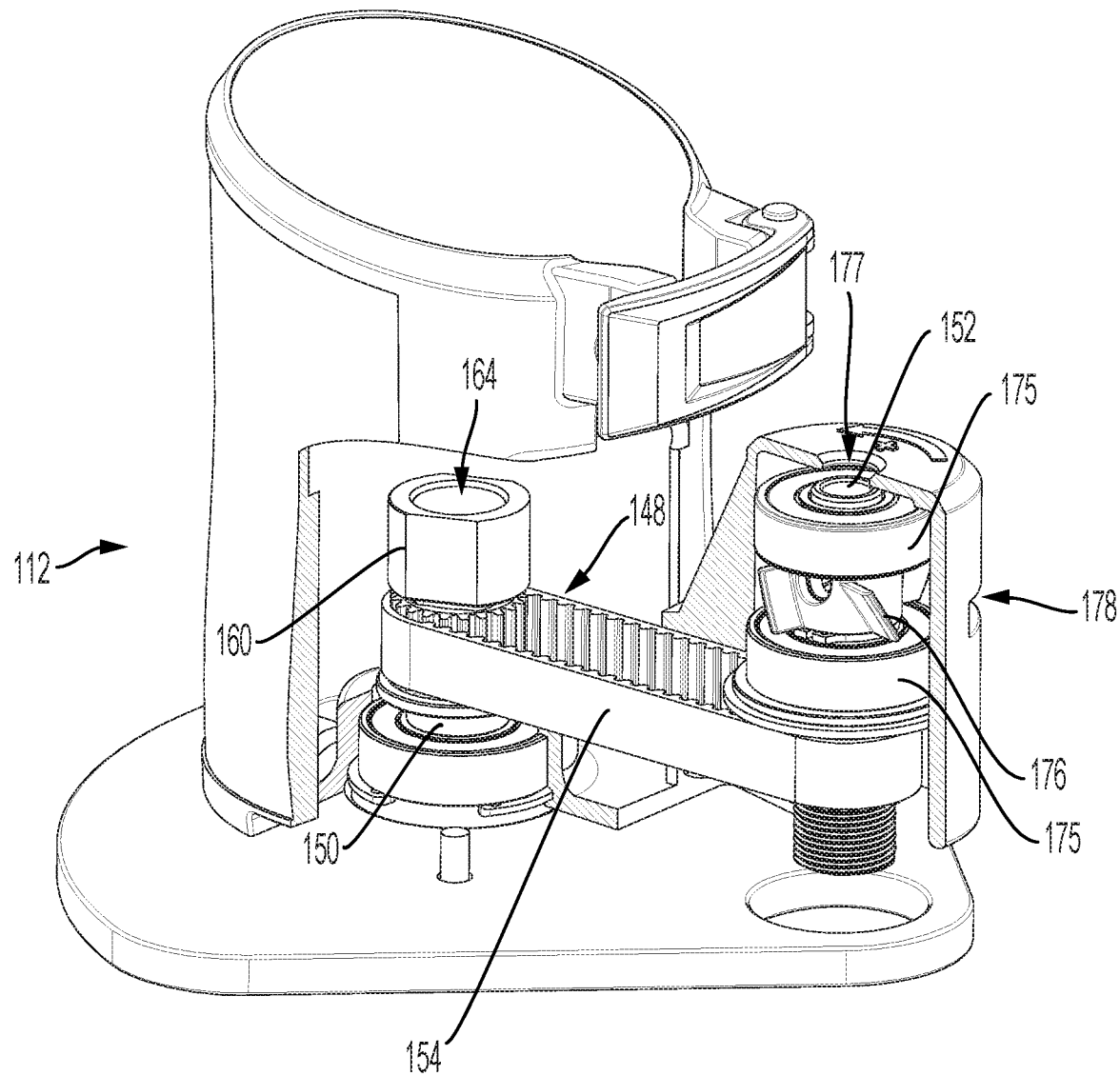
FIG. 10 is another perspective view of the base of FIG. 9, with portions removed.
Figure 11:
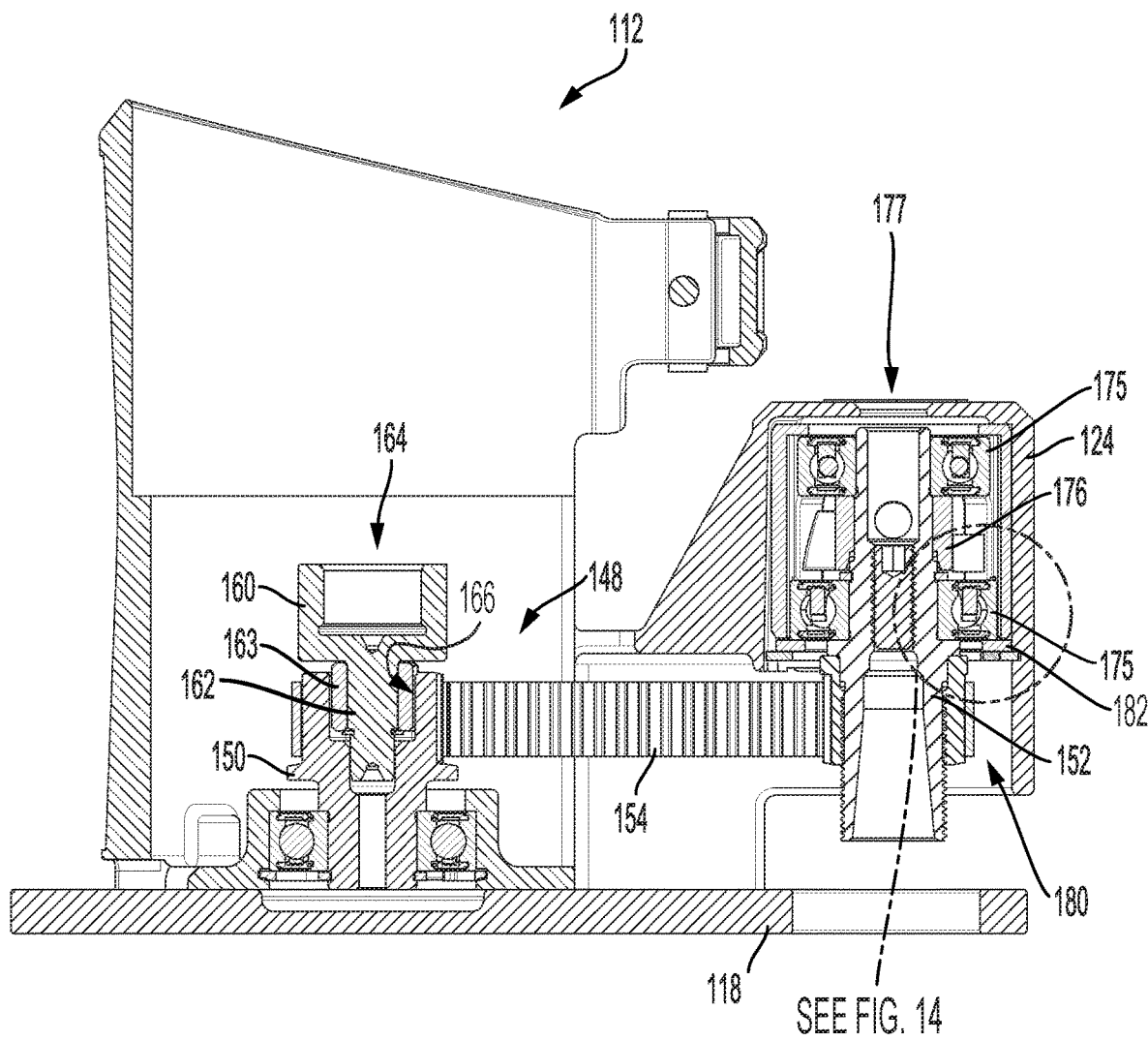
FIG. 11 is a cross-sectional view of the base of FIG. 9, taken along line 11-11 of FIG. 9.

FIGS. 9-11 illustrate a base 112 according to another embodiment of the invention. The base 112 is similar to the base 12 described above and includes substantially the same structure as the base 12. Likewise, the base 112 selectively receives and slidably supports the motor unit 14 in a manner similar to that described above with respect to the base 12. Accordingly, the following description focuses primarily on the structure and features of the base 112 that are different from the embodiments of the base 12 described above in connection with FIGS. 1-8. Features and elements of the base 12 that are described in connection with FIGS. 1-8 are numbered in the 100 series of reference numerals in FIGS. 9-11. It should be understood that the features of the base 112 that are not explicitly described below have the same properties as the features of the base 12.

The base 112 includes a base plate 118 and a base housing 120, the base housing 120 having a generally cylindrical annular sleeve 122 and an offset housing portion 124. The base 112 also includes a clamping mechanism 130 to control the opening and closing of a seam 128, and a drivetrain 148 having an input shaft 150 and an output shaft 152 rotatably coupled to the input shaft 150 by a belt 154 (e.g., a synchronous belt). The output shaft 152 is rotatably supported within the offset housing portion 124 by a pair of bearings 175 positioned between the output shaft 152 and the offset housing portion 124. The output shaft 152 supports a cooling fan 176 for co-rotation with the output shaft 152. The offset housing portion 124 defines an inlet opening 177 located adjacent an upper end of the output shaft 152, and outlet openings 178 located adjacent and radially outboard of the cooling fan 176. The offset housing portion 124 further defines a bottom opening 180 proximate and in facing relationship with the base plate 118. Although not shown in FIG. 11, a tool holder, similar to the tool holder 67 described above and illustrated in FIG. 8, is incorporated at the end of the output shaft 152 protruding from the bottom opening 180 for clamping a tool element.

In operation, the cooling fan 176 generates a cooling airflow within the offset housing portion 124 for cooling the offset base 112, including the drivetrain 148, the offset housing portion 124, and the cutting tool clamped to the tool holder (not shown). The cooling fan 176 draws outside air through the inlet opening 177, and directs the air toward the outlet openings 178 where the air is discharged radially outward. As the output shaft 152 rotates during operation, friction developed within the bearings 175 can generate heat and raise the operating temperature of, e.g., the drivetrain 148, the offset housing portion 124, and the cutting tool. The cooling airflow helps to prevent the operating temperatures of these components from getting too undesirably hot, which is a common issue with traditional offset bases.

In some embodiments (not shown), it is further contemplated that the inlet and/or the outlet openings may be relocated in relation to the offset housing portion 124. For example, an outlet opening may be located at or proximate the bottom opening 180, such that the cooling air is downwardly discharged around the tool holder and toward the baseplate 118 (and thus the work piece surface) rather than radially outward.

Figure 12:
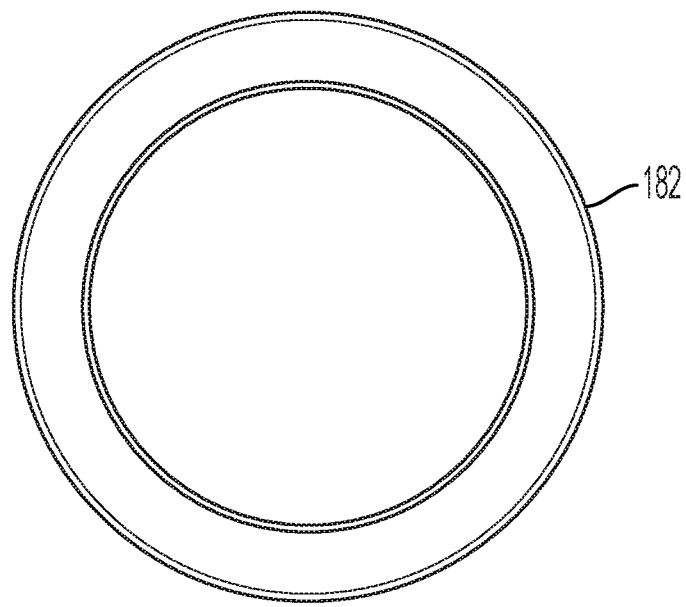
FIG. 12 is a plan view of a retaining plate of the base of FIG. 9.

With reference to FIGS. 11 and 12, the illustrated base 112 includes a retaining plate 182 located within the offset housing portion 124 and abutting the lower bearing 175. The retaining plate 182 effectively closes off the offset housing portion 124 near the lower bearing 175, thus obstructing the cooling airflow generated by the cooling fan 176 from discharging toward the bottom opening 180.

Figure 13:
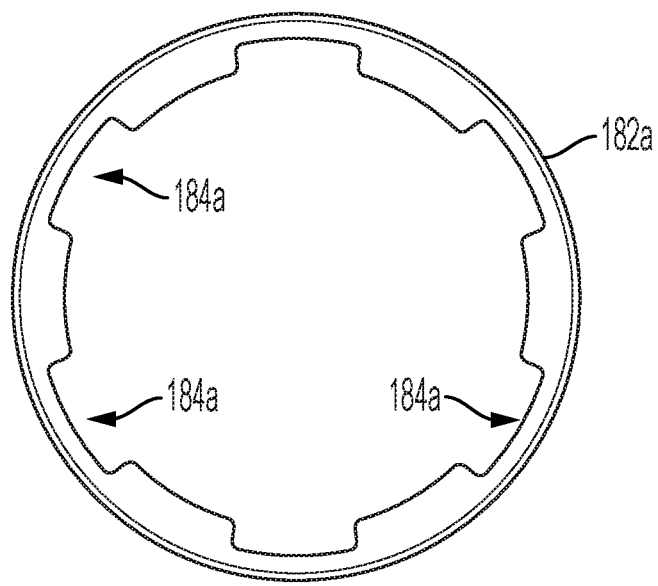
FIG. 13 is a plan view of another retaining plate of the base of FIG. 9.
Figure 14:
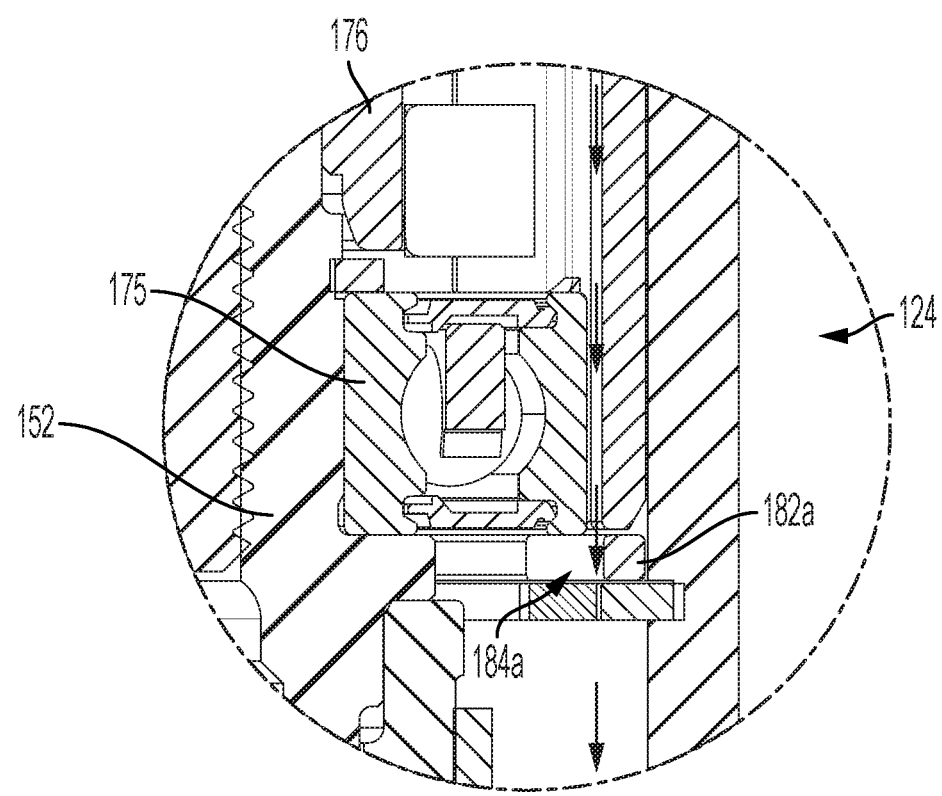
FIG. 14 is a detailed view of the cross-sectional view of FIG. 11.

With reference to FIGS. 13 and 14, in some embodiments, the base 112 includes a notched retaining plate 182a having circumferentially spaced radial notches 184a. The radial notches 184a permit a portion of the cooling airflow generated by the cooling fan 176 to flow downward toward the bottom opening 180, as indicated by the arrows shown in FIG. 14. The portion of the cooling airflow that passes through the notches 184a provides additional cooling to the lower bearing 175.

FIGS. 10 and 11 also show an adapter 160 similar to the adapter bit 60 described above and shown in FIG. 4. Like the adapter bit 60, the adapter bit 160 can likewise be threaded to the threaded end 43 of the spindle 42 to facilitate quick-attachment and quick-removal between the base 112 and the motor unit 14. The adapter bit 160 includes a threaded bore 164 into which the threaded end 43 of the spindle 42 is received. The adapter bit 160 also includes a male connection member 162 that differs somewhat from the male connection member 62 described above. Specifically, the illustrated male connection member 162 includes a square-shaped boss 162, and a damper 163 located about the square-shaped boss 162. In turn, the input shaft 150 of the base 112 defines a female hub 166 having a shape corresponding to that of the male connection member 162. When the motor unit 14 is fitted with the adapter bit 160 and inserted into the base 112, the male connection member 162 of the adapter bit 160 engages the female hub 166 (e.g., by a nominal slip-fit) as shown in FIG. 11 to rotationally unitize the spindle 42 and the input shaft 150. When thus arranged, the damper 163 resides between the walls of the female hub 166 and the square-shaped boss 162 and attenuates mechanical vibration and noise during operation of the base 112.

Various features of the invention are set forth in the following claims.

What is claimed is:

1. A router comprising:
    a motor unit including a motor and a spindle configured to output a torque supplied by the motor; and
    a base configured to selectively receive the motor unit to support the router on a work piece surface, the base including
        an input shaft configured to selectively couple to the spindle, the input shaft including a first pulley;
        an output shaft laterally offset from the input shaft, the output shaft including a second pulley and a tool holder; and
        a belt wrapped around the first and second pulleys to rotationally couple the input shaft to the output shaft; and
    an adapter bit configured to attach to the spindle and configured to couple the spindle to the input shaft, the adapter bit including a first connection member and a threaded bore that threadably receives the spindle;
    wherein the input shaft includes a second connection member that engages the first connection member to couple the adapter bit to the input shaft; and wherein when the motor unit is received into the base, the spindle couples to the input shaft.

2. The router of claim 1, wherein the base includes a housing including a keyway configured to lock the output shaft against rotation when a key is inserted through the keyway.

3. The router of claim 1, wherein the tool holder is configured to support a tool element, and wherein the base includes a set screw rotatable to adjust a cutting depth of the tool element.

4. The router of claim 1, wherein the belt is configured as a synchronous belt.

5. The router of claim 1, wherein the base includes a housing and a fan configured to generate an airflow within the base, the fan being supported on the output shaft for co-rotation therewith, wherein the housing includes an inlet opening located adjacent an upper end of the output shaft, wherein air is drawn into the base through the inlet opening when the fan is rotated, wherein the housing includes an outlet opening radially outboard of the fan, and wherein the air is discharged from the outlet opening by the fan.

6. The router of claim 1, wherein the motor includes a motor shaft, and wherein a portion of the motor shaft defines the spindle.

7. The router of claim 1, wherein the base further includes a housing having a sleeve, and wherein the motor unit is insertable into the sleeve.

8. The router of claim 1, wherein the base further includes a housing, a first bearing that rotatably supports the output shaft, and a second bearing that rotatably supports the output shaft.

9. The router of claim 1, wherein the base further includes a housing, a first bearing that rotatably supports the output shaft, and a second bearing that rotatably supports the output shaft.

10. The router of claim 1, wherein the base includes a housing and a base plate coupled to the housing, the base plate being configured to interface with the work piece surface.

* * * * *